(12) United States Patent
Kober et al.

(10) Patent No.: US 10,471,871 B2
(45) Date of Patent: Nov. 12, 2019

(54) HEADREST, METHOD OF INSTALLING A HEADREST, HEADREST SYSTEM

(71) Applicant: GRAMMER AG, Amberg (DE)

(72) Inventors: Steve Kober, Treuen (DE); Walter Mertel, Sulzbach-Rosenberg (DE)

(73) Assignee: GRAMMER AG, Amberg (DE)

( * ) Notice: Subject to any disclaimer, the term of this patent is extended or adjusted under 35 U.S.C. 154(b) by 0 days.

(21) Appl. No.: 15/820,694

(22) Filed: Nov. 22, 2017

(65) Prior Publication Data

US 2018/0154813 A1 Jun. 7, 2018

(30) Foreign Application Priority Data

Nov. 24, 2016 (DE) .......................... 10 2016 014 039

(51) Int. Cl.
*B60N 2/865* (2018.01)
*B60N 2/809* (2018.01)
*B60N 2/80* (2018.01)

(52) U.S. Cl.
CPC ............. *B60N 2/865* (2018.02); *B60N 2/809* (2018.02); *B60N 2002/899* (2018.02)

(58) Field of Classification Search
CPC ................................ B60N 2/865; B60N 2/809
USPC ........................................................ 297/391
See application file for complete search history.

(56) References Cited

U.S. PATENT DOCUMENTS

| 7,798,570 B2 * | 9/2010 | Kwiecinski | ............ | B60N 2/888 297/216.12 |
| 8,534,760 B2 | 9/2013 | Kotz | | |
| 2005/0077762 A1 * | 4/2005 | Kraemer | ................ | B60N 2/865 297/216.12 |
| 2010/0026061 A1 * | 2/2010 | McFalls | ................ | B60N 2/865 297/216.12 X |

FOREIGN PATENT DOCUMENTS

DE   202004009444 U   11/2004
DE   102009016835 A   10/2010

* cited by examiner

*Primary Examiner* — Anthony D Barfield
(74) *Attorney, Agent, or Firm* — Andrew Wilford

(57) ABSTRACT

The invention relates to a headrest (10) comprising at least one support rod (12a, 12b) by means of which a support (15) of the headrest is mounted on a vehicle seat, and a head-support part (25) is mounted on the support (15) in a fixed or movable manner relative to support (15), and the head-support part (25) covers a front part and a rear cover (17) held on the support (15) covers a rear part of the support (15), and the head-support part (25) has a primary edge and the support (15) has a secondary edge, and wherein the primary edge and the secondary edge overlap.
It was the object of the invention to create a headrest that can be produced more easily and which offers greater flexibility in relation to different headrest variants for different customers.
The object was achieved in that the head-support part comprises a front cover (18) and a separate head-support plate (16), wherein the front cover (18) forms the edge of the head-support part (25) and can be fastened on the head-support plate (16).

8 Claims, 3 Drawing Sheets

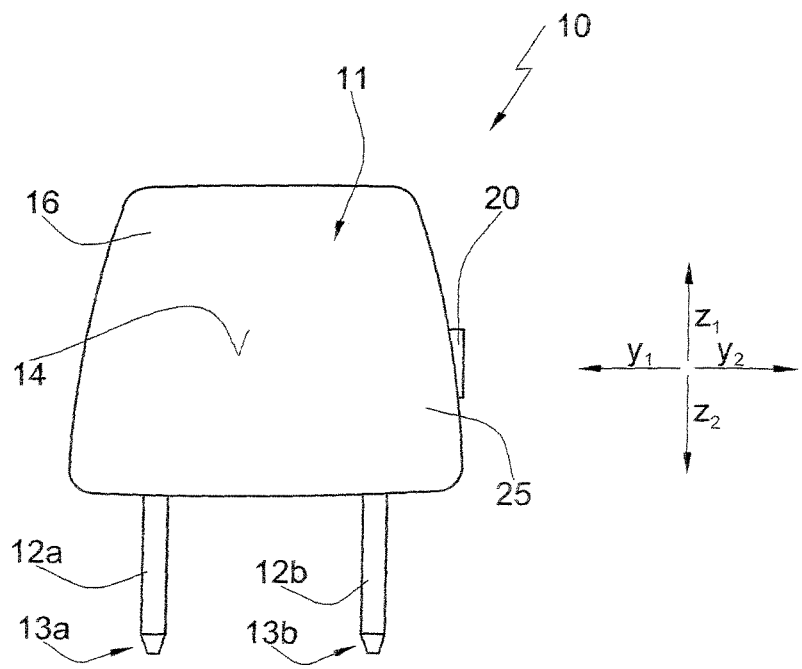
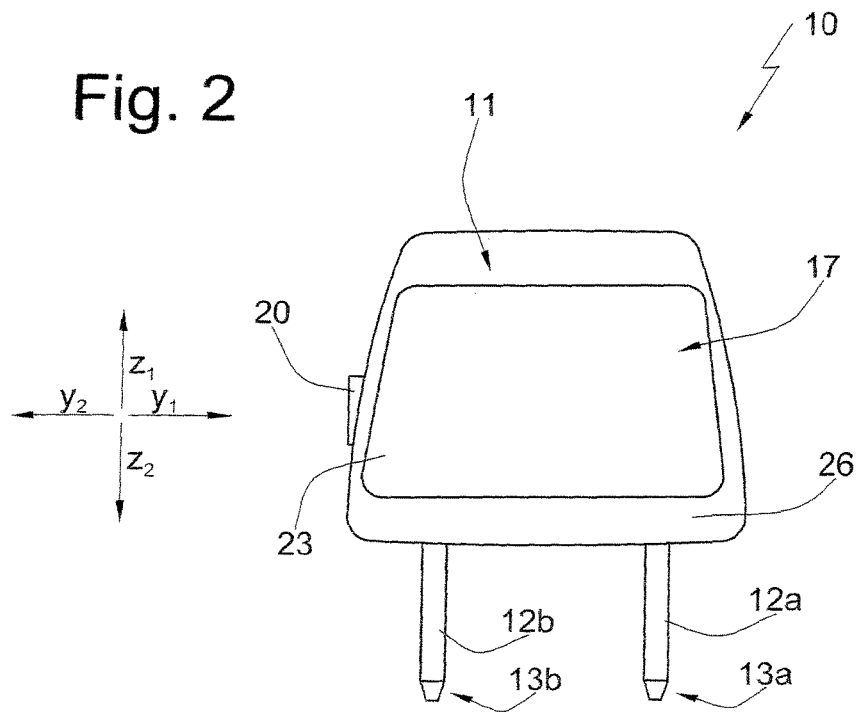

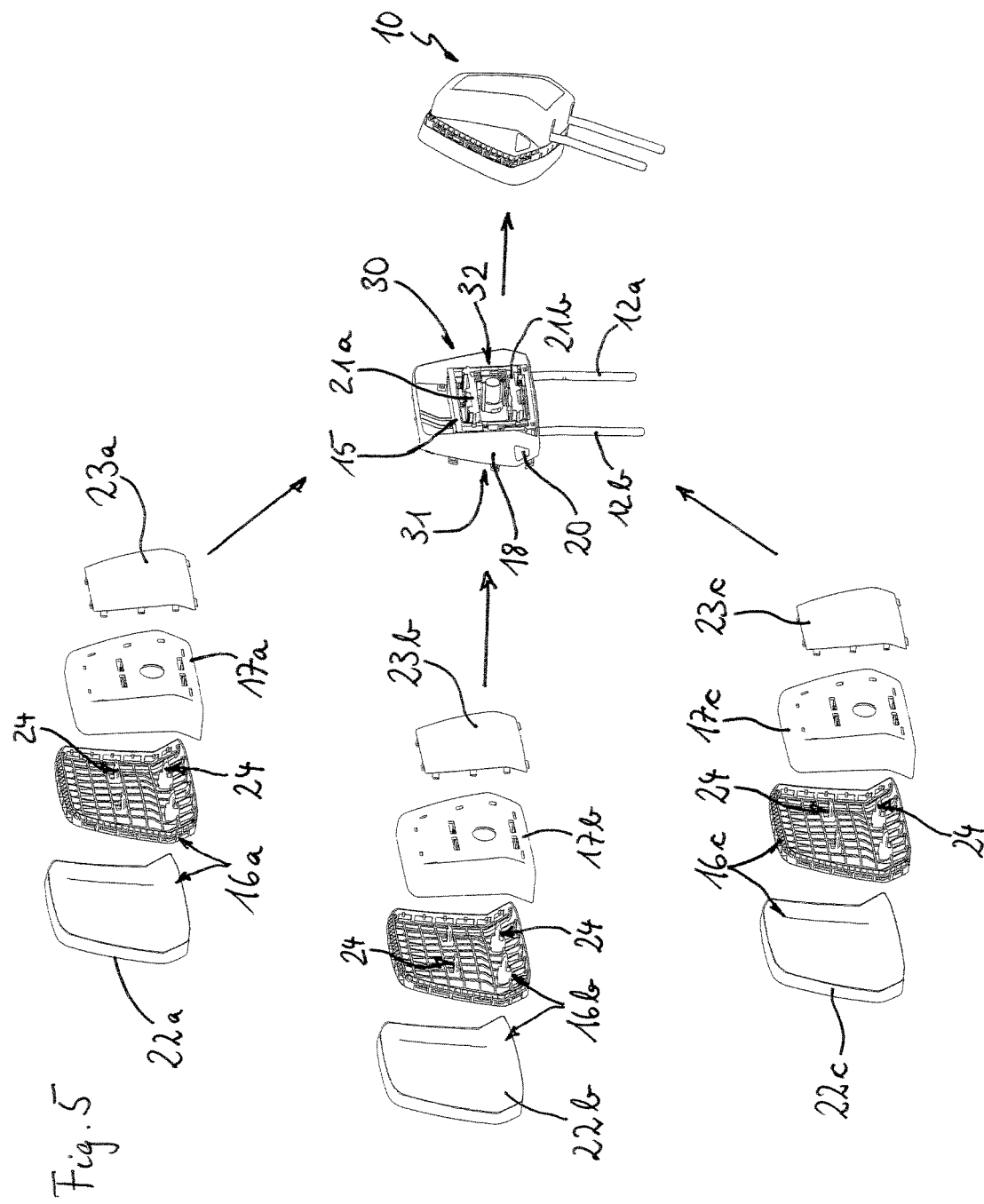

HEADREST, METHOD OF INSTALLING A HEADREST, HEADREST SYSTEM

The invention relates to a headrest, particularly a headrest of a vehicle seat.

A headrest of this type is known from DE 10 2009 038 631 [U.S. Pat. No. 8,534,760]. In the headrest, a support is mounted on support rods and can be fastened on a vehicle seat by means of the support rods. A head-support part can be adjusted forwards and backwards relative to the support in the horizontal direction. Also, a rear cover can be adjusted horizontally relative to the support. The head-support part and the rear cover enclose the support and each form a respective edge. The edges overlap telescopically in the horizontal adjustment.

The headrest comprises an actuating device, for actuating a locking device. The support can be adjusted horizontally when an actuating button is actuated. Owing to the overlapping of head-support part and rear cover, designing the arrangement of the actuating button was difficult. Furthermore, the mounting of the actuating device was complex, because the headbox was closed after the mounting of the rear cover and the head-support part. Covering the head-support part with a textile cover or a leather cover was difficult owing to the bent edges at the overlap regions, because folds occurred, which were not desired according to the quality requirements.

It was the object of the invention to create a headrest that can be produced more easily and that offers greater flexibility in relation to different headrest variants for different customers.

The headrest comprises at least one support rod that carry a head part of the headrest on a vehicle seat. The head part comprises a support and a head-support part that is mounted in a horizontally adjustable manner relative to the support or in a non-movably fixed manner on the support. In the case of movable mounting, the head-support part can accordingly be moved according to the respective seat position into desired positions horizontally to the head of the occupant or moved away from the head in the opposite direction. The head-support part and a rear cover held on the support enclose the support and cover the same in the process. The head-support part and the rear cover each have a respective edge, and the edges overlap one another. If the head-support part can be moved relative to the support, the edges move telescopically towards one another. In the sense of the invention, "telescopically" means that the parts overlap in all positions. This does not necessarily mean, however, that the parts are guided on one another in the overlap region.

The head-support part comprises a front cover and a separate head-support plate, and the front cover forms the overlap region of the head-support part and can be fastened on the head-support plate. The front cover comprises the overlap region of the head-support part, i.e. the region protruding in the direction of the rear cover. The front cover can be mounted on the support separately from the head-support plate. In this manner, the support is accessible until the mounting of the head-support plate. The head-support plate can for example be mounted on the front cover after the mounting of the front cover on the support has taken place. This facilitates the mounting of the headrest.

The head-support plate can be provided with a cover separately. The covering of the head-support plate is substantially easier, as the head-support plate has a flatter construction and does not have any bent edges. The front cover may for example not be provided with a cover. Upholstery material and weight is saved in this manner.

The headrest can for example be ready-mounted except for the head-support plate and the rear cover, i.e. even the front cover is mounted. The headrest pre-mounted in this manner can then be provided with the rear cover and with a head-support plate.

One embodiment is characterized in that the front screen is of tubular construction. After the mounting on the head-support plate, the head-support part then has a shell shape and encloses a front part of the support completely. Optically, the front cover forms a hollow cylinder after the mounting of the headrest, the longitudinal axis of which hollow cylinder extends from the rear forwards in accordance with the alignment of the seat and has an opening facing forwards and an opening facing rearwards. The support is located in an interior of the ring that encloses the support and extends in a frontal plane around the entire head part of the headrest.

One design of the invention is characterized in that the front cover has first fastening means that can be brought into engagement with second fastening means of the head-support plate. The head-support plate can then for example be mounted easily on the front cover after the mounting of the virtually complete headrest. The fastening means are formed for example by means that enable clipping of the head-support plate on the front cover.

A further design of the invention is characterized in that the rear cover has third fastening means that can be brought into engagement with fourth fastening means of the support. The rear cover can likewise be mounted on the support easily in this manner. The fastening means enable for example clipping the rear cover on the support.

One embodiment is characterized in that one head-support plate can be selected from a set of different head-support plates and can be fastened on the front cover. In this manner, it is possible for producing different headrests, to configure different head-support plates that are all compatible with the otherwise identical, pre-mounted headrest. Parts provision is reduced in this manner. The head-support plates may differ, for example with reference to the shape, the colour, the upholstery and the cover.

One embodiment is characterized in that an actuating switch of an actuating device for actuating a locking of the vertical adjustment and/or the horizontal adjustment of the head-support part is assigned to the front cover. As the front cover for example does not have a cover, the actuating switch can easily be mounted on the front cover. Furthermore, the actuating switch can be mounted easily, because access to the support is possible before the head-support part is mounted. If the front cover is constructed such that it can be moved relative to the support, for example the actuating device is constructed in such a manner that the locking device can be actuated in all positions of the front cover.

A further embodiment is characterized in that the rear cover is fixed relative to the support or is arranged in a movable manner. The rear cover is for example mounted on the support in such a manner that a movement of the rear cover is possible between a primary position and a secondary position. In this case, the rear cover is mounted on a movable part of the support. The rear cover can be movable for example in the same direction as the head-support part. In this case, the head part always appears to be narrow to the vehicle occupant in the adjustment direction. According to an alternative design, the rear cover is fixed, i.e. mounted on the support in a non-movable manner relative to the support. The fixed arrangement of the rear cover allows a simple construction.

One design of the invention is characterized in that the rear cover comprises a decorative plate that can be fastened on a base part of the rear cover. In this manner, for example the rear cover can be manufactured separately from the base part and only fastened on the headrest in an end phase of the mounting. Different variants of the rear cover can have for example different decorative plates.

One embodiment stands out in that one rear cover can be selected from a set of different rear covers and can be fastened on the support. Should the headrest be used in different variants, for example different decorative plates can be manufactured that are then fastened on a base part that is the same for all variants or alternatively be combined with different base parts and thus form the rear cover. This contributes to reducing the diversity of parts. The base part and the decorative cover may differ, for example with respect to the colour, the shape and the cover.

According to a second aspect, the invention relates to a method of mounting a headrest.

A method of this type is known from obvious prior use. A support was mounted on a support rod. Subsequently, the rear cover and a head-support part were mounted. Subsequently, the rear cover was screwed on the support and then the head-support part was clipped on the support. Finally, a button of the actuating device was mounted.

It was the object of the invention to create a method that allows easier mounting and offers greater flexibility in relation to different headrest variants for different customers.

In the method according to the invention, a support of the headrest is first mounted on at least one support rod. Subsequently, a front cover of a head-support part is mounted on the support. This mounting state of the headrest is termed the pre-mounted headrest. A head-support plate of the head-support part is subsequently fastened on the front cover. The fastening of the head-support plate can take place for example by means of clipping.

In the pre-mounted headrest, the support can be accessed from the front, because the head-support plate is not yet mounted. Furthermore, the pre-mounted headrest can be provided with different variants of the head-support plate and the rear cover. For example, various head-support parts can be provided with a different shape, colour or cover and be fastened on the pre-mounted headrest depending on the model.

According to an embodiment, a rear cover of the headrest is mounted on the support before or after the mounting of the head-support plate. The rear cover can be for example clipped or screwed on a movable or non-movable part of the support.

According to a third aspect, the invention relates to a headrest system.

Further advantages of the invention emerge on the basis of the following description of an exemplary embodiment illustrated in the figures. In the schematic figures:

FIG. 1 is a front view of the headrest,

FIG. 2 is a rear view of the headrest,

FIG. 5 is an exploded illustration of an assembly kit system of the headrest.

Figure 3:
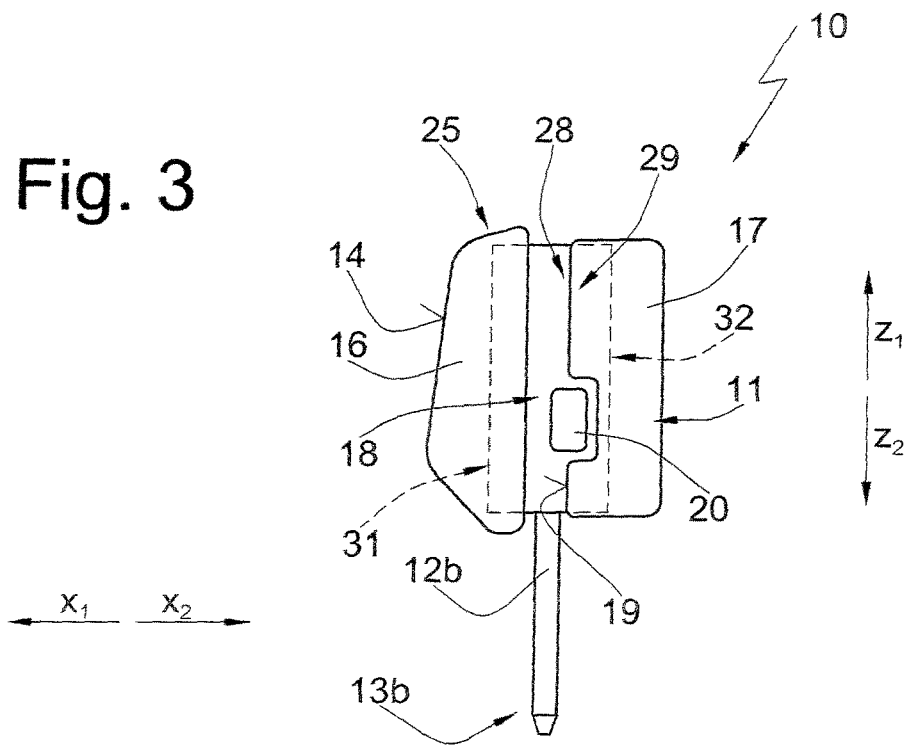
FIG. 3 is a side view of the headrest with a head-support part in a rear position.

A headrest is referenced with the reference number 10 in the figures. Identical reference numbers in the different figures designate corresponding parts, even if lower case letters are appended or omitted. The head-support part 25 may comprise for example a cushion.

According to FIG. 1, the headrest 10 comprises a head part 11 that can be mounted on a vehicle seat, which is not illustrated, using support rods 12*a* and 12*b*. Corresponding supports for guiding and mounting edges 13*a* and 13*b* of the support rods 12*a* and 12*b* are fastened on the vehicle seat. The support rods may be movable for example relative to the bearings of the vehicle seat or relative to the head part 11 in the vertical direction $z_1$ and $z_2$ and lockable in different positions. A head-support part 25 is constructed on the head part 11 that is provided with a head-support surface 14.

A rear view of the headrest is shown in FIG. 2. It can be seen that the head part 11 has a rear cover 17. The rear cover 17 comprises a base part 26 and a decorative plate 23.

According to FIG. 3, the head part 11 comprises the head-support part 25 and the rear cover 17. In FIG. 3, it can be seen that the head-support part 25 has a front cover 18 that is connected to a head-support plate 16. The front cover 18 is constructed as a hollow cylinder that has a front opening 31 pointing in direction $x_1$ and a rear opening 32 pointing in direction x2. The wall of an end 28 of the front cover 18 overlaps with a wall of an edge 29 of the rear cover 17. The edge 29 in this case lies outside of the edge 28 and has an edge 19.

A button 20 is arranged on the front cover 18, so that an occupant can unlock a locking device and move the head-support part 25, for example in direction $x_1$ or x2. The button 20 can be moved out of a release position in direction $y_1$ counter to the force of a spring into an actuated position. The spring loads the button 20 in direction $y_2$ in return. The head-support part 25 can be locked in a releasable manner in different positions in the X direction in this manner. This shall not be covered further at this point, however.

The head-support plate 16 can be moved out of the rear position illustrated in FIG. 3 together with the front cover 18 in direction $x_1$ to the head of the seat occupant. In the present exemplary embodiment, the rear cover 17 likewise moves in direction $x_1$ when the head-support part is moved in direction x1. The rear cover 17 travels half the distance with respect to the head-support part 25. According to an alternative embodiment, the rear cover 17 could however also move in a different travel relationship in relation to the head-support part 25 or be fastened in a non-movable manner on the support 15.

Figure 4:
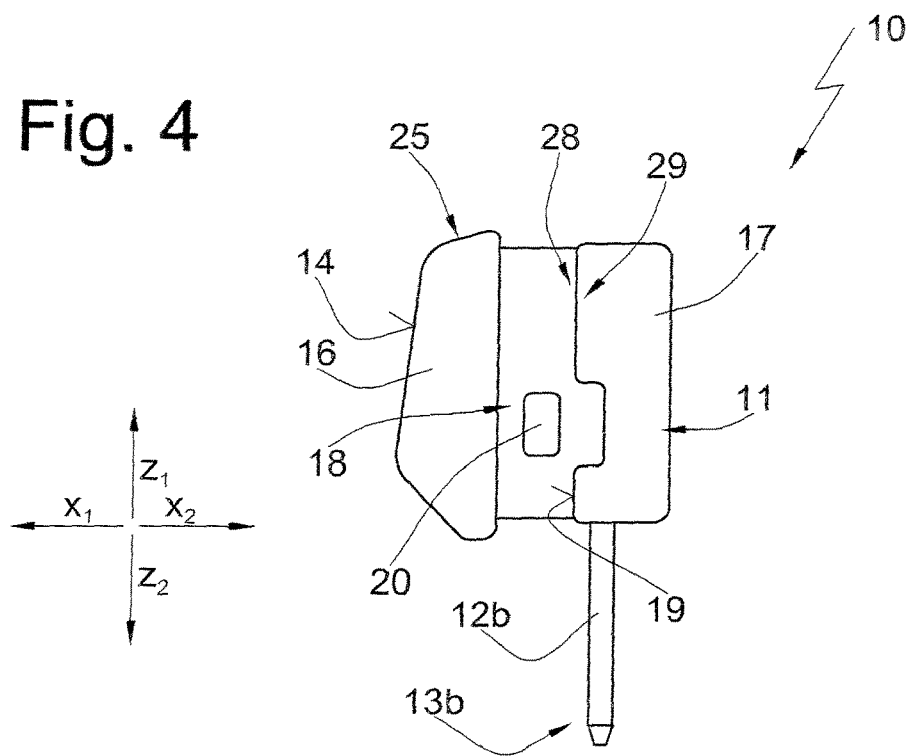
FIG. 4 is a side view like FIG. 3 with the head-support part in a front position.

In FIG. 4, the head-support part 16 is illustrated in the front position, from which it can be moved in direction x2, for example into the rear position or into a position between the rear position and the front position.

In FIG. 5, the headrest 10 according to the invention is depicted as part of a headrest system in an exploded illustration. In FIG. 5, it can be seen that the headrest 10 comprises a support 15, on which the support rods 12*a* and 12*b* are held. The head-support part 25 comprises two cassettes 21*a* and 21*b* that are guided in a movable manner on the support 15 in direction $x_1$ and x2. The front cover 18 is fastened on the cassettes 21*a* and 21*b*, which front cover forms a tube that is open in the directions $x_1$ and x2, and the support 15 is accommodated in the interior of the tube. The cassettes 21*a* and 21*b* can in this manner be moved with the front cover 18 in direction $x_1$ and $x_2$ and locked in different positions in stages.

With the aid of this pre-mounted headrest that is labelled as a whole with the reference number 30 in FIG. 5, different design variants of the headrest can be created in a simple manner, as illustrated in FIG. 5.

To produce a first design variant, a first head-support plate 16*a*, comprising a base body 27 and a first cushion 22*a*, and a first rear cover 17*a* comprising a base part 26 and a decorative plate 23a, are used. The first head-support plate 16a and the first rear cover 17a are fastened on the pre-mounted headrest, and the head-support plate 16a is fastened on the front cover 18 and the rear cover 17a is fastened on the support 15.

To create a second design variant, a second head-support plate 16b, comprising the base body 27 and a second cushion 22b and a second rear cover 17b, comprising a base part 26 and a decorative plate 23b, are used. The second head-support plate 16b and the second rear cover 17b are fastened in the same manner as in the first design variant.

A third design variant is created, in that a third head-support plate 16c, comprising the base body 27 and a third cushion 22c and a third rear cover 17c, comprising a base part 26 and a decorative plate 23c, are used. The fastening of the third head-support plate 16c and the third rear cover 17c takes place in the same manner as in the first design variant.

The cushions 22a, 22b and 22c, the rear covers 17a, 17b and 17c and the decorative plates 23a, 23b and 23c may differ for example in relation to the colour, the shape and the cover.

A simple fastening is for example possible, if the head-support parts 16a, 16b and 16c are provided with first fastening means 24 that can be clipped to second fastening means of the front cover 18 that are not illustrated. The rear covers 17a, 17b and 17c have third fastening means that are not illustrated and can be clipped to fourth fastening means of the support 15 that are likewise not illustrated. In the present exemplary embodiment, the fourth fastening means are formed by areas of toothed shafts that mesh with tooth systems of the cassettes 21a and 21b and the support 15 and in this manner form a guide whose use prevents jamming of the cassettes 21a and 21b.

The invention claimed is:

1. A headrest comprising:
    at least one support rod on a vehicle seat;
    a support on the support rod;
    a head-support part mounted on the support in a fixed or movable manner relative to the support and comprised of a head-support plate and a front cover, the cover forming a primary edge;
    a rear cover carried on the support and having a secondary edge, the primary edge and the secondary edge overlapping;
    first fastening means on the front cover; and
    second fastening means on the head-support plate and engageable with the first fastening means for securing the cover to the head-support plate.

2. The headrest according to claim 1, wherein the head-support plate can be selected from a set of different head-support plates and can be fastened on the front cover.

3. The headrest according to claim 2, wherein an actuating switch of an actuating device for actuating a vertical adjustment or a horizontal adjustment of the head-support part interacts with the front cover.

4. The headrest according to claim 1, wherein the rear cover is fixed relative to the support or is movable thereon.

5. The headrest according to claim 1, wherein the rear cover comprises a decorative plate.

6. The headrest according to claim 1, wherein the head-support plate can be selected from a set of different decorative plates and can be fastened on a base part of the front cover.

7. A headrest system comprising:
    a support rod;
    a rear cover;
    a front part;
    a rear part;
    a support held on the support rod;
    a head-support part fixed or movable manner on the support and that forms an overlap region with the rear cover, the head-support part covering the front part and the rear cover covering the rear part of the headrest, the head-support part having a primary edge and the rear cover having a secondary edge overlapping the primary edge;
    a front cover of the head-support part carried on the support, the head-support plate being from a set of different separate head-support plates;
    first fastener means on each of the covers; and
    second fastener means on each of the parts releasably securing the respective covers to the respective parts of the front cover.

8. The headrest system according to claim 7, wherein the rear cover can be selected from a set of different rear covers and is releasably fastenable on the support.

* * * * *